Patented Nov. 19, 1935

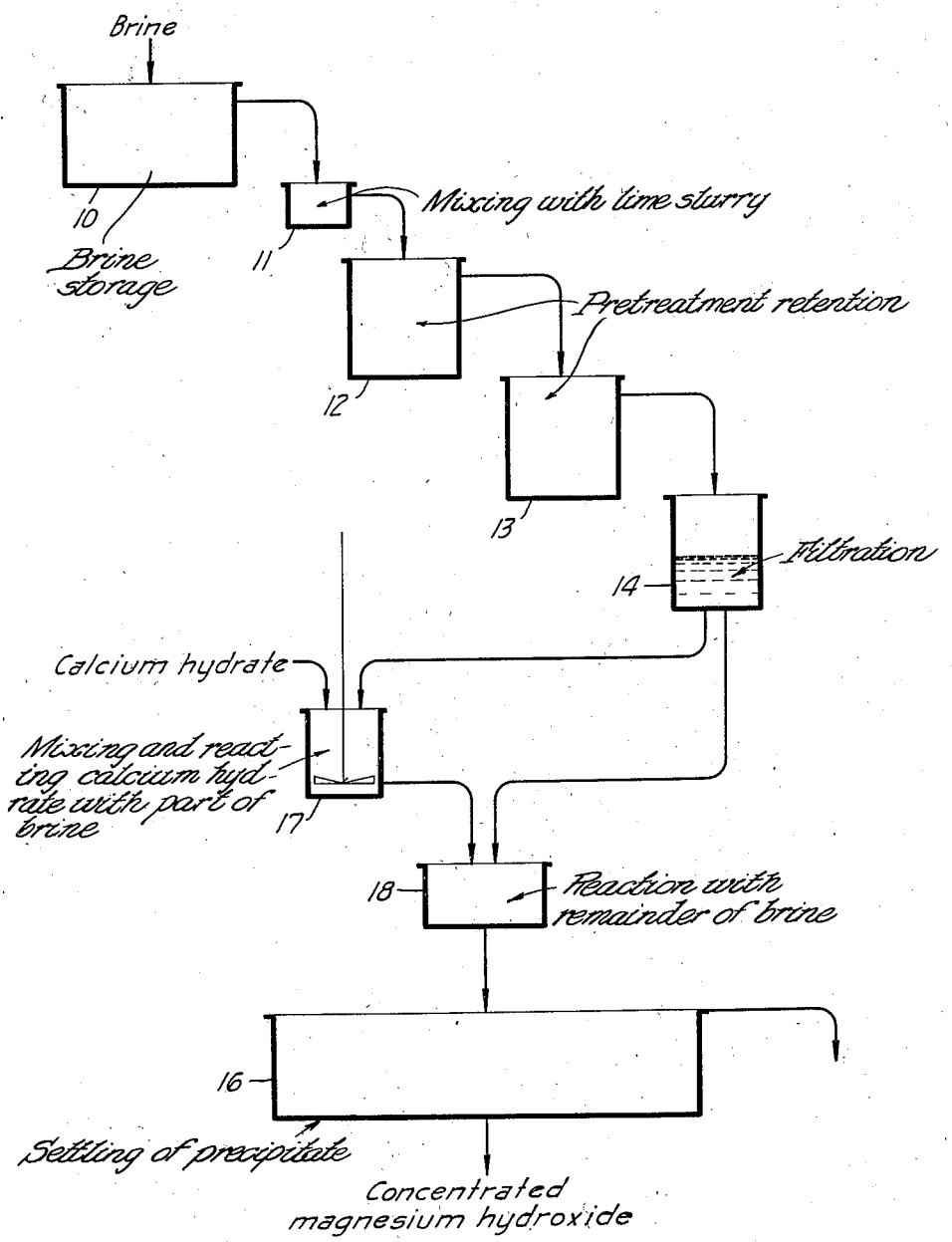

2,021,501

UNITED STATES PATENT OFFICE 2,021,501

PROCESS FOR THE MANUFACTURE OF MAGNESIUM PRODUCTS

William H. Farnsworth, Manistee, Mich., and Montel Montgomery, Los Angeles, Calif., assignors to Marine Chemicals Company, Ltd., South San Francisco, Calif., a corporation of Delaware Continuation of application Serial No. 608,202, April 29, 1932. This application May 21, 1934, Serial No. 726,632

3 Claims. (Cl. 23—201)

This invention relates generally to processes for the manufacture of magnesium products, such as magnesium hydroxide or magnesium carbonate, from brines containing convertible magnesium salts, salts as magnesium chloride, magnesium sulphate, magnesium bromide, and the like. The process disclosed herein is applicable to relatively dilute brine, such as sea water, sea water concentrates, or to more concentrated inland brines.

It is an object of the invention to provide a process of the above character which will make possible the manufacture of the desired magnesium products at a minimum cost. To this end our process is characterized by the precipitation of magnesium hydroxide from the brine, in such physical form that subsequent concentration and washing of the precipitated magnesium hydroxide are greatly facilitated.

A further object of the invention is to provide a process of the above character which is readily controllable, and which will facilitate production of magnesium products of uniform quality.

Further objects of the invention will appear from the following description in which the preferred embodiments of the invention have been set forth in detail in conjunction with the accompanying drawing. The appended claims are to be accorded a range of equivalents consistent with the state of the prior art.

In the past, it has been proposed to react brine containing convertible magnesium salts, with calcium hydroxide in solution, to precipitate magnesium hydroxide. In such processes the magnesium hydroxide precipitated is in amorphous or gelatinous form. It is difficult to effect a separation between such amorphous magnesium hydroxide and the brine from which it is precipitated, for the reason that its settling rate is less than .3 foot per hour and is often as low as about 1 inch per 24 hours. We have found that a reaction with calcium hydroxide particles carried out in the absence of material amounts of calcium hydroxide in free solution, results in the precipitation of magnesium hydroxide having a relatively high settling rate.

Our process can be explained in detail by reference to the accompanying drawing, which is a flow sheet of a specific embodiment of our process as applied to sea water. Storage of sea water is indicated at 10. From 10 the sea water is caused to flow through the mixing tank 11 and then through the pre-treatment retention tanks 12 and 13. Calcium hydrate, preferably in the form of a highly reactive slurry, is introduced at 11 and a reaction between the lime and the sea water occurs in tanks 12 and 13. This pretreatment is carried out primarily for the purpose of removing calcium bicarbonate usually present in sea water, and to precipitate simultaneously other removable impurities such as suspended solid matter, silica and the like, rather than to precipitate magnesium hydroxide in substantial quantities; therefore a minimum amount of lime is employed to accomplish the desired results.

It may be explained at this point that sea water contains many salts, including calcium bicarbonate, magnesium chloride, magnesium sulphate, and magnesium bromide. Since these salts are precipitated by treatment of the sea water with lime, it is desirable that the calcium bicarbonate is removed by a preliminary treatment, in order to prevent contamination of the desired magnesium products by salts insoluble in the mother liquor, such as calcium carbonate. Because of the presence of magnesium chloride and magnesium sulphate, it has been found necessary to introduce substantially twice the amount of lime theoretically required to remove the calcium bicarbonate. In other words, to precipitate one gram of calcium bicarbonate the addition of 0.915 gram of calcium hydrate is required. The calcium bicarbonate is precipitated in the form of calcium carbonate, and a slight amount of magnesium hydroxide is also precipitated.

From the tank 13 the pretreated brine is passed through a suitable filter 14, to remove the precipitate resulting from the pretreatment, and to also remove any remaining silt or other foreign material. The flow of brine from filter 14 is split; the major portion, say 95%, is introduced directly into a reaction tank 18, while the remainder is diverted through a mixing vessel 17. Lime hydrate, in finely divided condition, is introduced into vessel 17 and thoroughly intermingled with the brine. From vessel 17, the brine, together with the calcium hydrate which has been introduced into the same, flows into a reaction tank 18, where it is mixed with the remaining portion of the sea water, the outflow of which is introduced into the setting tank 16. The calcium hydrate introduced at 17 should have relatively high availability, and is preferably sufficiently finely divided to pass through a 60-mesh screen.

As the diverted portion of the brine is contacted with the dry calcium hydrate, a reaction immediately commences between the calcium hydrate and the convertible magnesium salts, in which magnesium hydroxide is precipitated. The precipitated magnesium hydroxide forms as a film about each lime particle. Such a film does not prevent further reaction, as it is permeable to the surrounding brine, but it does retard the speed of the reaction. As the reaction progresses in tank 18, particles of magnesium hydroxide are formed which rapidly settle out by gravity. The settling rate is in excess of .3 foot per hour, and in actual practice has exceeded 1 foot per hour.

Microscopic studies of the magnesium hydroxide particles precipitated by our process have disclosed that the physical properties of the magnesium hydroxide differ from the amorphous or gelatinous form, there being distinct evidence of crystallization.

The precipitated magnesium hydroxide settles within tank 16, and can be removed as an underflow concentrate. This concentrate can be washed by well-known counterflow methods, and can be further treated in any desired manner to form commercial products, such as milk of magnesia or magnesium carbonate.

With dilute brines such as sea water, we have found it preferable to partially carry out the reaction between the calcium hydrate and the brine, prior to introducing the calcium hydrate into the settling tank 16. If the dry calcium hydrate is introduced directly into tank 16, there is a tendency for the lime particles coated with magnesium hydroxide to settle before reaction with the brine is completed, resulting in lime contamination of the magnesium hydroxide concentrate.

While our process is applicable to batch operations, it is preferably conducted continuously to secure utmost capacity for a given equipment. In continuous operation, the flow of brine between the different parts of the apparatus is continuous, magnesium hydroxide concentrate is continually removed from the settling tank 16, and calcium hydrate is continuously introduced into vessel 17.

The present application is a continuation of copending application Serial No. 608,202, filed April 29, 1932.

We claim:

1. In a process for manufacturing magnesium products from brine containing convertible magnesium salts, the steps of initially forming a material consisting of calcium hydrate particles which have a film coating of magnesium hydroxide, said material being formed apart from the main body of the brine to be treated and containing substantially no lime in free solution, and then utilizing such material to react with the main body of the brine at a controlled rate.

2. In a process for manufacturing magnesium products from brine containing convertible magnesium salts, the steps of initially forming a material consisting of calcium hydrate particles which have a film coating of magnesium hydroxide, said material being formed apart from the main body of the brine to be treated and containing substantially no lime in free solution and substantially no magnesium hydroxide except said film coating, introducing said material to the main body of the brine, and then permitting all the precipitated magnesium hydroxide to settle through the mother liquor.

3. In a process for manufacturing magnesium products from brine containing convertible magnesium salts, the steps of premixing dry calcium hydroxide with a minor portion of the brine, contacting the entire mix with the main body of the brine, and then permitting all of the precipitated magnesium hydroxide to settle through the mother liquor.

WILLIAM H. FARNSWORTH.
MONTEL MONTGOMERY.